US012346107B2

(12) United States Patent
Hama et al.

(10) Patent No.: US 12,346,107 B2
(45) Date of Patent: Jul. 1, 2025

(54) REMOTE OPERATION ASSISTANCE DEVICE AND REMOTE OPERATION ASSISTANCE METHOD

(71) Applicant: KOBELCO CONSTRUCTION MACHINERY CO., LTD., Hiroshima (JP)

(72) Inventors: Ryota Hama, Hiroshima (JP); Masaki Otani, Hiroshima (JP)

(73) Assignee: Kobelco Construction Machinery Co. Ltd., Hiroshima (JP)

( * ) Notice: Subject to any disclaimer, the term of this patent is extended or adjusted under 35 U.S.C. 154(b) by 262 days.

(21) Appl. No.: 17/917,980

(22) PCT Filed: Apr. 28, 2021

(86) PCT No.: PCT/JP2021/017097
§ 371 (c)(1),
(2) Date: Oct. 10, 2022

(87) PCT Pub. No.: WO2021/230092
PCT Pub. Date: Nov. 18, 2021

(65) Prior Publication Data
US 2023/0142088 A1    May 11, 2023

(30) Foreign Application Priority Data
May 13, 2020    (JP) .................. 2020-084327

(51) Int. Cl.
*G05D 1/00*    (2024.01)
*E02F 9/20*    (2006.01)
(52) U.S. Cl.
CPC .......... *G05D 1/0044* (2013.01); *E02F 9/205* (2013.01)

(58) Field of Classification Search
None
See application file for complete search history.

(56) References Cited

U.S. PATENT DOCUMENTS 5,707,237 A * 1/1998 Takemoto ............. A63F 13/285
348/121
8,139,108 B2 * 3/2012 Stratton ............... G05D 1/0044
348/121
(Continued)

FOREIGN PATENT DOCUMENTS

CN    107111928 A    8/2017
CN    107882103 A    4/2018
(Continued)

OTHER PUBLICATIONS

The extended European Search Report dated Jul. 24, 2023 issued in the corresponding EP Patent Application No. 21803548.3.

*Primary Examiner* — Redhwan K Mawari
*Assistant Examiner* — Kai Wang
(74) *Attorney, Agent, or Firm* — Carrier, Shende & Associates P.C.; Fulchand P. Shende; Joseph P. Carrier

(57) ABSTRACT

A remote operation assistance device enables an operator to get a feel for the controls of a work machine before communication is established between a remote operation device and the work machine. The remote operation assistance device as configured includes a first assistance processing element. The first assistance processing element executes a control for displaying, on a remote output interface, a simulated environment image for simulating remote operation of the work machine.

11 Claims, 8 Drawing Sheets

(56) References Cited

U.S. PATENT DOCUMENTS

| | | | |
|---|---|---|---|
| 10,474,228 B2 | 11/2019 | Niccolini et al. | |
| 10,508,417 B2* | 12/2019 | Hasegawa | G06T 11/40 |
| 11,455,905 B2 | 9/2022 | Steib et al. | |
| 11,989,018 B2* | 5/2024 | Tsuchiya | G05D 1/224 |
| 2002/0059320 A1* | 5/2002 | Tamaru | E01C 19/00 |
| 2009/0254971 A1* | 10/2009 | Herz | G06Q 10/10 |
| | | | 726/1 |
| 2014/0200863 A1* | 7/2014 | Kamat | E02F 9/245 |
| | | | 703/1 |
| 2018/0137446 A1* | 5/2018 | Shike | G06Q 50/08 |
| 2018/0218304 A1* | 8/2018 | Shike | G06Q 10/0631 |
| 2019/0019429 A1* | 1/2019 | Palberg | G09B 9/05 |
| 2019/0284027 A1* | 9/2019 | Albrecht | B66C 13/46 |
| 2020/0074766 A1* | 3/2020 | Onishi | E02F 9/2054 |
| 2021/0148088 A1* | 5/2021 | Seki | B60R 1/23 |

FOREIGN PATENT DOCUMENTS

| | | | | |
|---|---|---|---|---|
| CN | 108885842 A | | 11/2018 | |
| DE | 112008000307 T5 | | 12/2009 | |
| JP | H-11119640 A | * | 10/1997 | |
| JP | 110-252101 A | | 9/1998 | |
| JP | 2947726 B2 | | 9/1999 | |
| JP | 2017030960 A | * | 2/2017 | |
| JP | 2019-063952 A | | 4/2019 | |
| WO | WO-2018124098 A1 | * | 7/2018 | B66C 13/40 |
| WO | WO-2020202372 A1 | * | 10/2020 | G05D 1/0016 |

\* cited by examiner

REMOTE OPERATION ASSISTANCE DEVICE AND REMOTE OPERATION ASSISTANCE METHOD

TECHNICAL FIELD

A remote operation assistance device according to the present invention relates to a system that assists an operator who remotely operates a work machine.

BACKGROUND ART

A remote operation system comprising a remote operation device and a work machine is known, the remote operation device including a master operation unit that receives operations directly from an operator and the work machine including an onboard slave operation unit which is communicably connected to an actuator and which directly manipulates control levers of the work machine based on input magnitude received by the actuator from the operator (for example, see Patent Literature 1).

CITATION LIST

Patent Literature

Patent Literature 1: Japanese Patent Laid-Open No. 2000-252101

SUMMARY OF INVENTION

Technical Problem

In such a remote operation system, the communication of an operation signal between the remote operation device and the work machine makes it possible for the slave operation unit to operate the control levers of the work machine based on the input magnitude that the actuator receives from the operator.

However, until communication is established and the slave operation unit is ready to operate the control levers of the work machine based on input magnitude received by the actuator, the operator is unable to grasp the behavior of the work machine according to the driving of the control levers operated by the slave operation unit in response to input magnitude performed on the master operation unit. As a result, until communication is established and the operator gets a feel for the controls, the operator performs operations on the main operation unit more carefully than necessary, and work efficiency is lowered.

Accordingly, in light of such circumstances, an objective of a remote operation assistance device according to the present invention is to provide a remove operation device and a remote operation assistance system enabling the operator to get a feel for the controls of a work machine before communication is established between the remote operation device and the work machine.

Solution to Problem

A remote operation assistance device used to simulate remote operation of a work machine, wherein
the remote operation assistance device includes a first assistance processing element, and
the first assistance processing element executes a first assistance process, the first assistance process being a process for acquiring first designated operation information which is information regarding an input into a remote operation mechanism manipulated to simulate the remote operation of the work machine and simulated operation command information which is information regarding the manipulation of the remote operation mechanism, generating, based on the first designated operation information and the simulated operation command information, a simulated environment image which is an image showing a simulated view of how the pose of the work machine changes, and transmitting the simulated environment image to a remote output interface.

Effects

According to the remote operation assistance device as configured, the first assistance processing element acquires first designated operation information which is information regarding an input into a remote operation mechanism manipulated to simulate the remote operation of the work machine and simulated operation command information which is information regarding the manipulation of the remote operation mechanism, generates, based on the first designated operation information and the simulated operation command information, a simulated environment image which is an image showing a simulated view of how the pose of the work machine changes, and transmits the simulated environment image to a remote output interface. With this arrangement, before remotely operating the work machine that the operator is scheduled to remotely operate in reality, the operator is able to undergo a simulated experience (simulation) of operating the work machine and thereby grasp the operating characteristics of the work machine. Moreover, even after the operator has finished remotely operating the work machine in reality, the operator is able to undergo a simulated experience (simulation) of operating the work machine and thereby review the operating characteristics of the work machine.

DESCRIPTION OF EMBODIMENTS (Configuration of Remote Operation Assistance System)

Figure 1:
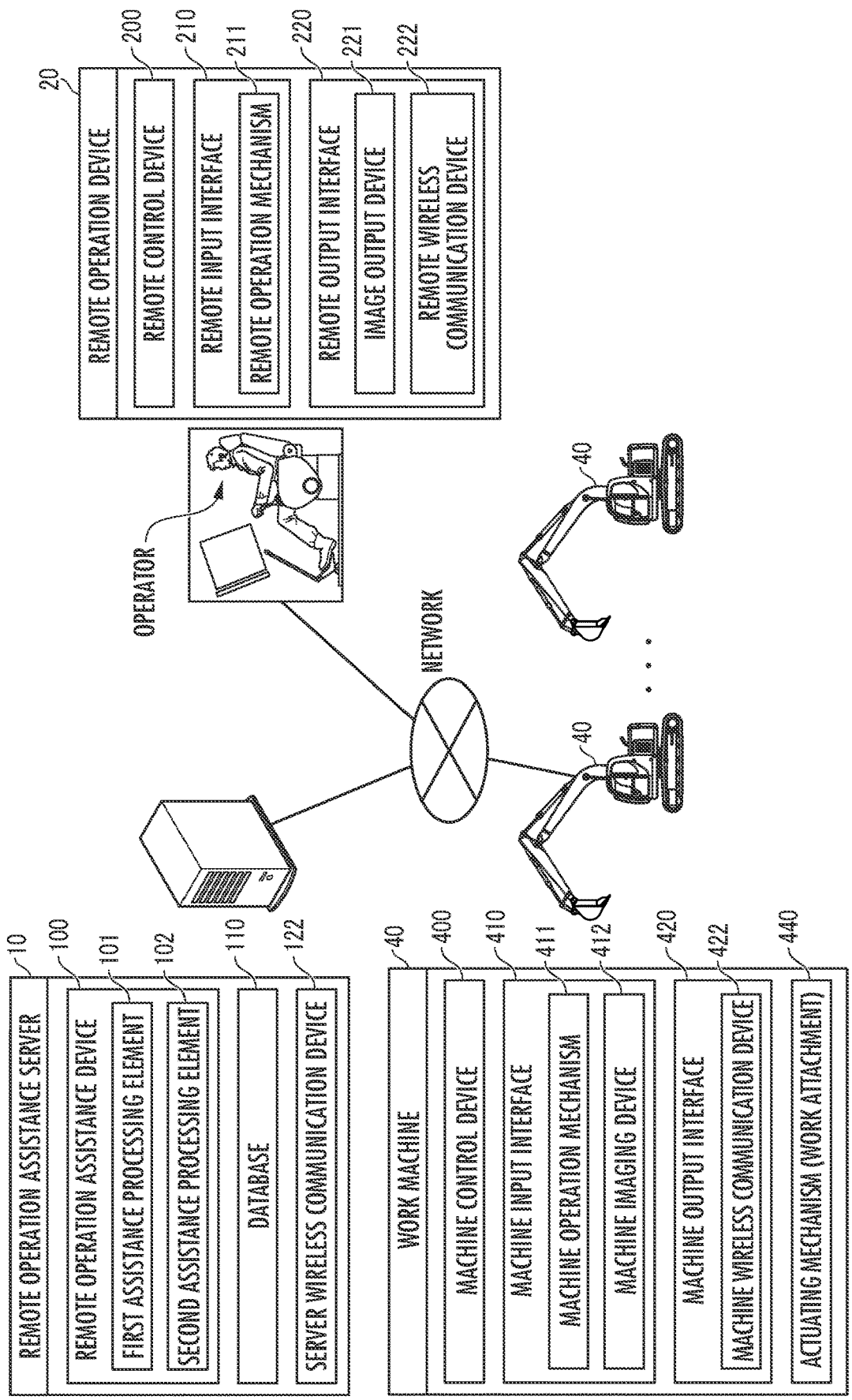
FIG. 1 is an explanatory diagram related to the configuration of a remote operation assistance system as one embodiment of a remote operation assistance device configured according to the present invention.

A remote operation assistance system as one embodiment of a remote operation assistance device configured according to the present invention illustrated in FIG. 1 comprises a remote operation assistance server 10 and a remote operation device 20 for remotely operating a work machine 40. The remote operation assistance server 10, the remote operation device 20, and the work machine 40 are configured to communicate bidirectionally over a network. The bidirectional communication network between the remote operation assistance server 10 and the remote operation device 20 may be the same as or different from the bidirectional communication network between the remote operation assistance server 10 and the work machine 40.

Also, there may be one or multiple work machines 40. Moreover, multiple work machines 40 may be the same model of work machine or different types of work machines.

In addition, remote operation is a concept that refers to an operator operating the work machine 40 from a location distanced from the work machine 40 without boarding the work machine 40.

Also, an operator is a concept that refers to a person who operates the remote operation device 20 to maneuver the work machine 40.

(Configuration of Remote Operation Assistance Server)

The remote operation assistance server 10 comprises a remote operation assistance device 100, a database 110, and a server wireless communication device 122. The remote operation assistance device 100 comprises a first assistance processing element 101 and a second assistance processing element 102. Each assistance processing element comprises a computational processing device (a single-core processor, or a multi-core processor or a processor core including such a processor) that loads necessary data and software from a storage device such as a memory and executes computational processing described later on the data in accordance with the software.

The database 110 stores and retains captured image data and the like. The database 110 may also store and retain attributes of the work machine 40 in association with information related to details about work that the work machine 40 is scheduled to perform. The database 110 may also store and retain information related to general operating characteristics of the work machine 40. The database 110 may also store and retain information related to general operating characteristics of the work machine 40 in association with information related to general work details about work to be performed using the work machine 40. The database 110 may also store and retain information related to operating characteristics specific to the work machine 40. The database 110 may also store and retain information related to operating characteristics specific to the work machine 40 in association with information related to details about specific work to be performed using the work machine 40.

(Configuration of Remote Operation Device)

The remote operation device 20 comprises a remote control device 200, a remote input interface 210, and a remote output interface 220. The remote control device 200 comprises a computational processing device (a single-core processor, or a multi-core processor or a processor core including such a processor) that loads necessary data and software from a storage device such as a memory and executes computational processing on the data in accordance with the software. The remote input interface 210 comprises a remote operation mechanism 211. The remote output interface 220 comprises an image output device 221 and a remote wireless communication device 222.

The remote operation mechanism 211 includes a travel operation device, a slew operation device, a boom operation device, an arm operation device, and a bucket operation device. Each operation device includes a control lever that receives turning operations. The control lever (travel lever) of the travel operation device is operated to move a lower traveling body 450 which is one actuating mechanism 440 of the work machine 40. The travel lever may also serve as a travel pedal. For example, a travel pedal secured to a base or a lower end part of the travel lever may be provided. The control lever (slew lever) of the slew operation device is operated to move a hydraulic slew motor comprising a slewing mechanism 430 which is one actuating mechanism 440 of the work machine 40. The control lever (boom lever) of the boom operation device is operated to move a boom cylinder 442 of the work machine 40. The control lever (arm lever) of the arm operation device is operated to move an arm cylinder 444 of the work machine 40. The control lever (bucket lever) of the bucket operation device is operated to move a bucket cylinder 446 of the work machine 40.

Figure 2:
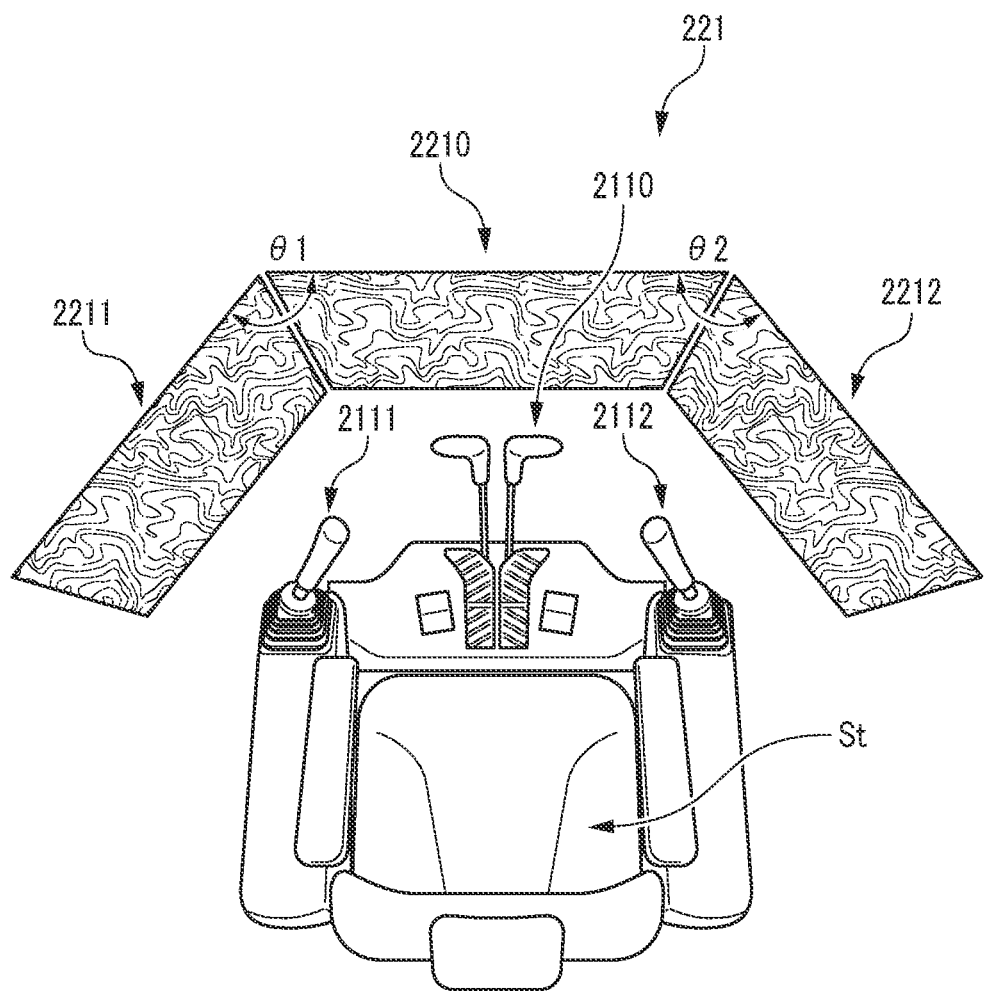
FIG. 2 is an explanatory diagram related to the configuration of a remote operation device.

The control levers included in the remote operation mechanism 211 are arranged around a seat St where the operator sits, as illustrated in FIG. 2, for example. The seat St is configured like a high-back chair with armrests, but may be a sitting area of any configuration allowing the operator to sit, such as a configuration like a low-back chair without a headrest or a configuration like a backless chair.

At the front of the seat St, a pair of left and right travel levers 2110 corresponding to left and right crawler tracks are arranged side by side from left to right. A single control lever may also serve as multiple control levers. For example, a left control lever 2111 provided at the front of a left-side frame of the seat St illustrated in FIG. 2 may function as an arm lever when operated in the front and back directions and also function as a slew lever when operated in the left and right directions. Similarly, a right control lever 2112 provided at the front of a right-side frame of the seat St illustrated in FIG. 2 may function as a boom lever when operated in the front and back directions and also function as a bucket lever when operated in the left and right directions. The lever pattern may be changed freely according to operating instructions from the operator.

As illustrated in FIG. 2, for example, the image output device 221 comprises a central image output device 2210, a left-side image output device 2211, and a right-side image output device 2212 having substantially rectangular screens disposed directly in front, diagonally forward left, and diagonally forward right from the seat St, respectively. The respective screens (image display areas) of the central image output device 2210, the left-side image output device 2211, and the right-side image output device 2212 may have the same shape and size or different shapes and sizes.

As illustrated in FIG. 2, the right edge of the left-side image output device 2211 is adjacent to the left edge of the central image output device 2210 such that an inclination angle θ1 (for example, $120° \leq θ1 \leq 150°$) is obtained between the screen of the central image output device 2210 and the screen of the left-side image output device 2211. As illustrated in FIG. 2, the left edge of the right-side image output device 2212 is adjacent to the right edge of the central image output device 2210 such that an inclination angle θ2 (for example, 120°≤θ2≤150°) is obtained between the screen of the central image output device 2210 and the screen of the right-side image output device 2212. The inclination angles θ1 and θ2 may be the same or different.

The respective screens of the central image output device 2210, the left-side image output device 2211, and the right-side image output device 2212 may by parallel to the vertical direction or inclined relative to the vertical direction. At least one image output device from among the central image output device 2210, the left-side image output device 2211, and the right-side image output device 2212 may also be composed of a plurality of subdivided image output devices. For example, the central image output device 2210 may be configured as a pair of vertically adjacent image output devices having substantially rectangular screens. The image output device 221 (central image output device 2210, left-side image output device 2211, and right-side image output device 2212) may further comprise a speaker (audio output device).

(Configuration of Work Machine)

The work machine 40 refers to a work vehicle that can be utilized at a worksite. The work machine 40 includes at least piece of construction equipment capable of dozing or excavating earth and sand. The construction equipment includes at least one of a hydraulic excavator with a bucket or a bulldozer with a blade. The work machine 40 comprises a machine control device 400, a machine input interface 410, a machine output interface 420, and an actuating mechanism 440. The machine control device 400 comprises a computational processing device (a single-core processor, or a multi-core processor or a processor core including such a processor) that loads necessary data and software from a storage device such as a memory and executes computational processing on the data in accordance with the software.

Figure 3:
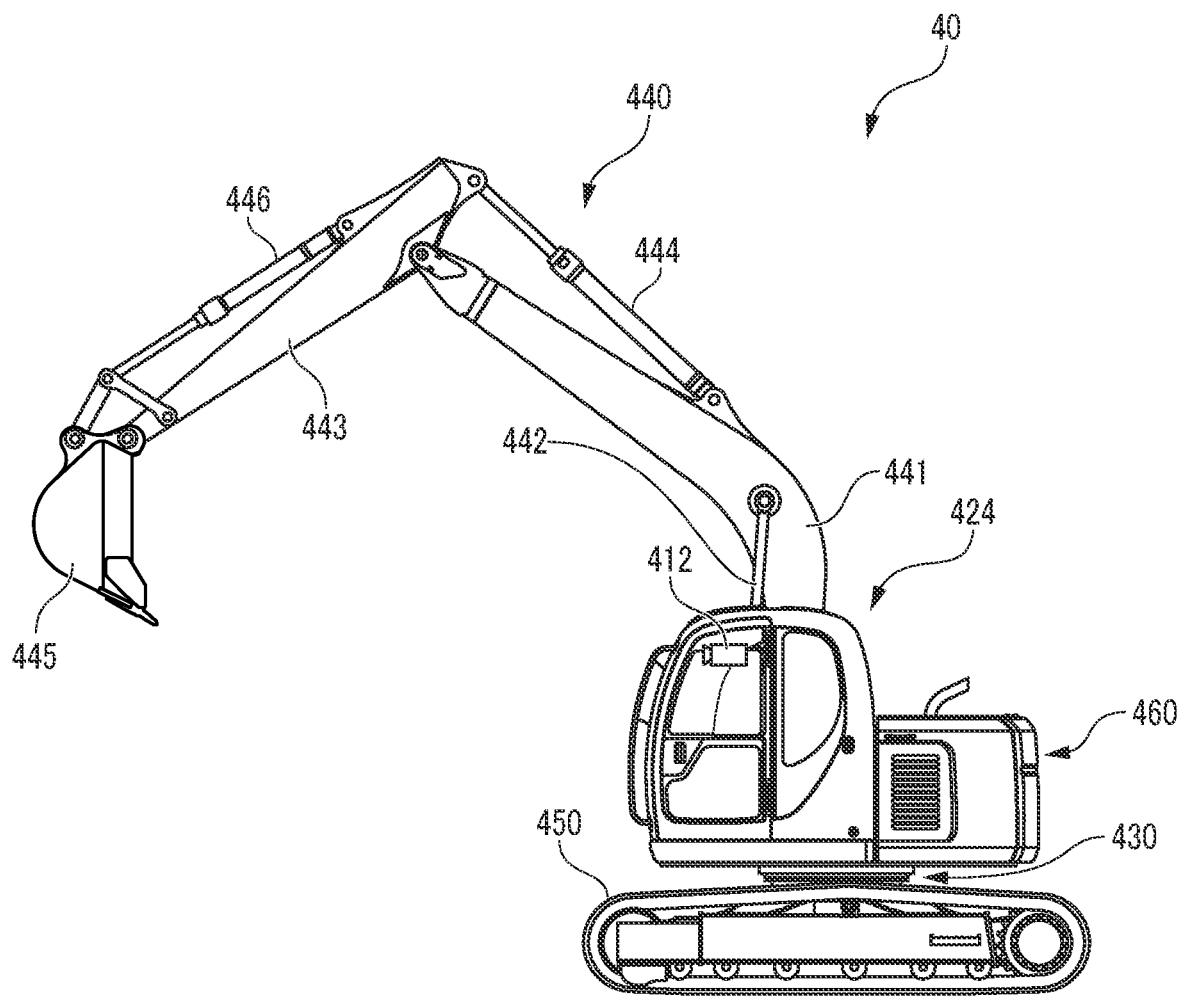
FIG. 3 is an explanatory diagram related to the configuration of a work machine.

The work machine 40 is a crawler excavator (construction equipment), for example, and as illustrated in FIG. 3, comprises a crawler-type lower traveling body 450 and an upper slewing body 460 slewably mounted onto the lower traveling body 450 through a slewing mechanism 430. A cab 424 (driver's compartment) is provided in a front-left part of the upper slewing body 460. The actuating mechanism 440 is provided in a front-center part of the upper slewing body 460.

The machine input interface 410 comprises a machine operation mechanism 411 and a machine imaging device 412. The machine operation mechanism 411 comprises a plurality of control levers arranged similarly to the remote operation mechanism 211 around a seat disposed inside the cab 424. A driving mechanism or robot that receives signals corresponding to the manipulated state of the remote control levers and moves machine control levers based on the received signals is provided in the cab 424. The machine imaging device 412 is installed in the cab 424, for example, and captures images of the environment, including at least a part of the actuating mechanism 440, seen through a front window and a pair of left and right side windows partitioned by a pair of left and right pillars 4240 ("L" and "R" will be appended to the reference sign when distinguishing between left and right) on the front side of the cab 424. Some or all of the front window and the side windows may also be omitted.

The machine output interface 420 comprises a machine wireless communication device 422.

A work attachment that serves as the actuating mechanism 440 comprises a boom 441 raisably and lowerably mounted on the upper slewing body 460, an arm 443 rotatably coupled to the leading end of the boom 441, and a bucket 445 rotatably coupled to the leading end of the arm 443. A boom cylinder 442, arm cylinder 444, and bucket cylinder 446 comprising extensible hydraulic cylinders are mounted onto the actuating mechanism 440.

The boom cylinder 442 extends or contracts by receiving a supply of hydraulic oil and is interposed between the boom 441 and the upper slewing body 460 so as to rotate the boom 441 in the raising or lowering direction. The arm cylinder 444 extends or contracts by receiving a supply of hydraulic oil and is interposed between the arm 443 and the boom 441 so as to rotate the arm 443 about the horizontal axis relative to the boom 441. The bucket cylinder 446 extends or contracts by receiving a supply of hydraulic oil and is interposed between the bucket 445 and the arm 443 so as to rotate the bucket 445 about the horizontal axis relative to the arm 443.

(Functions)

Functions of the remote operation assistance system having the above configuration will be described using the flowcharts illustrated in FIG. 4 and FIG. 5. In the flowcharts, blocks labeled "C●" are used for simplicity and denote transmission and/or reception of data and conditional branching at which processes are executed in the branching direction on condition of transmission and/or reception of the data.

Figure 4:
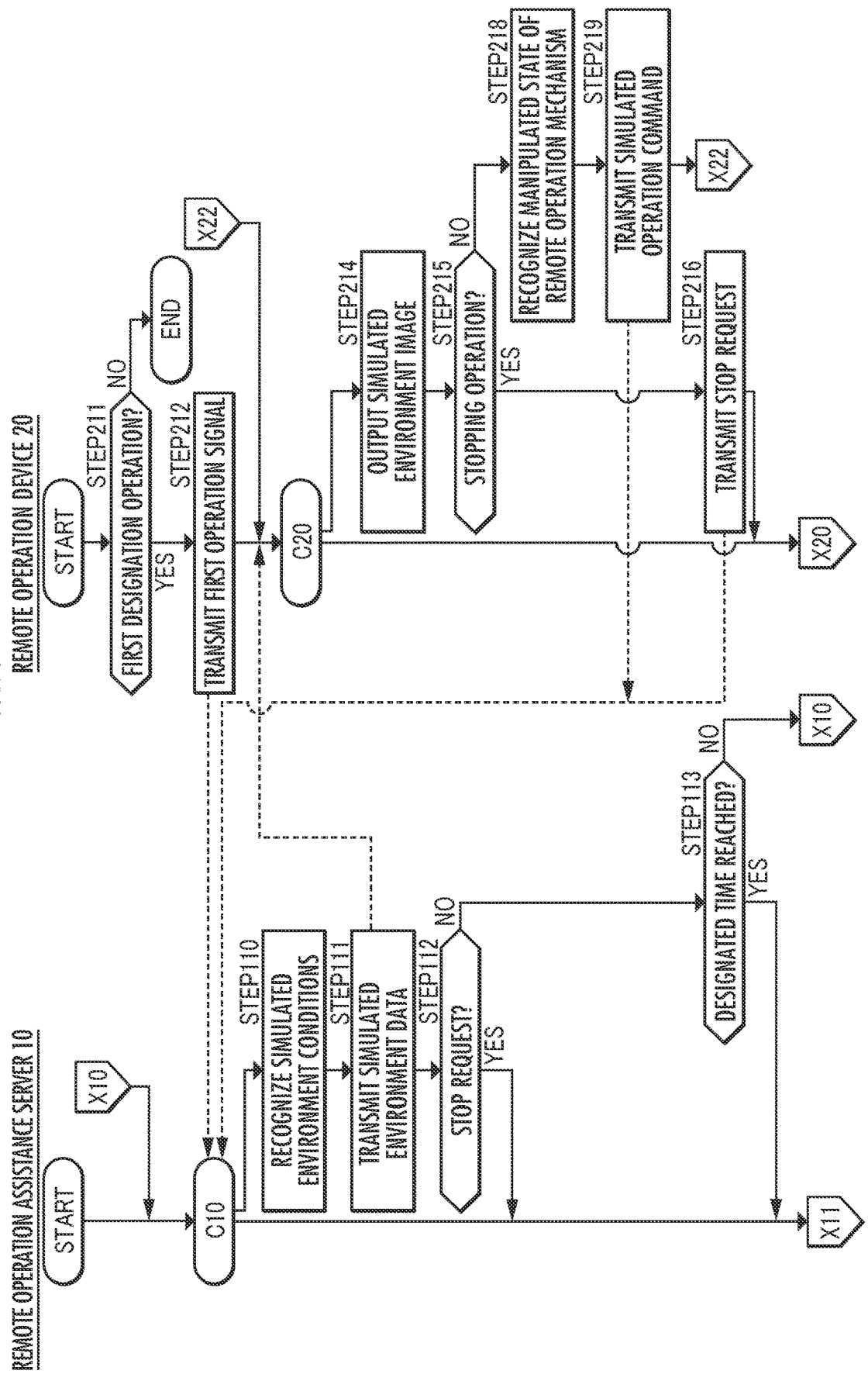
FIG. 4 is an explanatory diagram related to the functions of a first assistance processing element as one embodiment of a remote operation assistance device configured according to the present invention.

The flowchart illustrated in FIG. 4 will be used to describe a first assistance process according to the present embodiment. The first assistance process is a process related to a simulation of remotely operating the work machine 40.

In the remote operation device 20, as a precondition for the first assistance process according to the present embodiment, the remote control device 200 determines whether the operator has performed an operation for designating the work machine 40 that the operator intends to remotely operate (not illustrated). If the determination result is negative (not illustrated), the remote control device 200 repeats the determination process. On the other hand, if the determination result is positive (not illustrated), the remote control device 200 executes the processes from STEP 211.

For example, the "operation for designating the work machine 40" is a concept that includes the operator tapping, pushing, pinching, or swiping the remote input interface 210 or the like to select one or more work machines 40 that the operator intends to remotely operate from among a plurality of work machines 40 displayed on the central image output device 2210.

Also, as another example of the "operation for designating the work machine 40", the operator taps or pushes the remote input interface 210 or the like to select one or more types of work that the operator intends to perform from among a plurality of types of work displayed on the central image output device 2210.

In this case, for example, the work machine 40 that is to perform each type of work is predetermined, and by selecting one or more types of work, one or more work machines 40 to be remotely operated when the one or more types of work are performed and a designated time (second designated time point) which is the start time for each type of work may be determined automatically.

Specifically, slope formation work is to be performed by a hydraulic excavator present at a worksite in Hiroshima, and by selecting the slope formation work, the hydraulic excavator to be remotely operated when the slope formation work is performed and the designated time of 10 AM which is the start time of the slope formation work may be determined automatically.

In the remote operation device 20, the remote control device 200 determines whether the operator has performed a first designation operation (FIG. 4, STEP 211). Also, the "first designation operation" is a concept that includes the operator manipulating the remote operation mechanism 211 to simulate remote operation of the work machine 40.

In the remote operation device 20, if the determination result in STEP 211 is negative (FIG. 4, STEP 211: NO), the remote control device 200 ends the process. On the other hand, if the determination result is positive (FIG. 4, STEP 211: YES), the remote control device 200 transmits, through the remote wireless communication device 222, a first operation signal containing information related to a request (simulation request) for simulating operation of the work machine 40 to the remote operation assistance server 10 (FIG. 4, STEP 212).

The "first operation signal" is a concept that includes a signal related to simulation operations that the operator inputs by operating the remote input interface 210 to simulate remote operation of the work machine 40. The "first operation signal" includes at least one of an identifier of the remote operation device 20 or an identifier of the operator. Also, the "first operation signal" includes an identifier of the work machine 40 selected by the operator.

Here, the identifier of the remote operation device 20 is a concept that includes information with which the remote operation assistance server 10 identifies the remote operation device 20 to which each piece of data should be transmitted and received from among a plurality of existing remote operation devices 20.

Also, the identifier of the operator is a concept that includes information with which the remote operation assistance server 10 identifies the operator to which each piece of data should be transmitted and received from among a plurality of existing operators.

Also, the identifier of the work machine 40 is a concept that includes information with which the remote operation assistance server 10 identifies the work machine 40 to which each piece of data should be transmitted and received from among a plurality of existing work machines 40.

If the remote operation assistance server 10 acquires the first operation signal through the server wireless communication device 122 (FIG. 4, C10), the first assistance processing element 101 recognizes simulated environment conditions (FIG. 4, STEP 110).

The simulated environment conditions include at least the identifier of the work machine 40 selected by the operator. Also, the behavior and environmental change of the work machine 40 at a virtual worksite are recognized as the simulated environment conditions. In addition, the first assistance processing element 101 transmits simulated environment data to the remote operation device 20 based on the simulated environment conditions (FIG. 4, STEP 111).

The simulated environment data includes a simulated environment image or information for generating a simulated environment image. The simulated environment image is an image showing a simulated view of the work machine 40 at a virtual worksite, and is an image that can be updated to show changes in the pose of the work machine 40 depending on the recognized behavior and environmental change. The simulated environment image is, for example, an image of the work machine 40 expressed by computer graphics (hereinafter, the simulated environment image may be referred to as a simulated image, a CG image, or a virtual image, as appropriate).

In the remote operation device 20, if the remote control device 200 receives simulated environment data (FIG. 4, C20), the simulated environment image is outputted to the remote output interface 220 (image output device 221) (FIG. 4, STEP 214).

Figure 6:
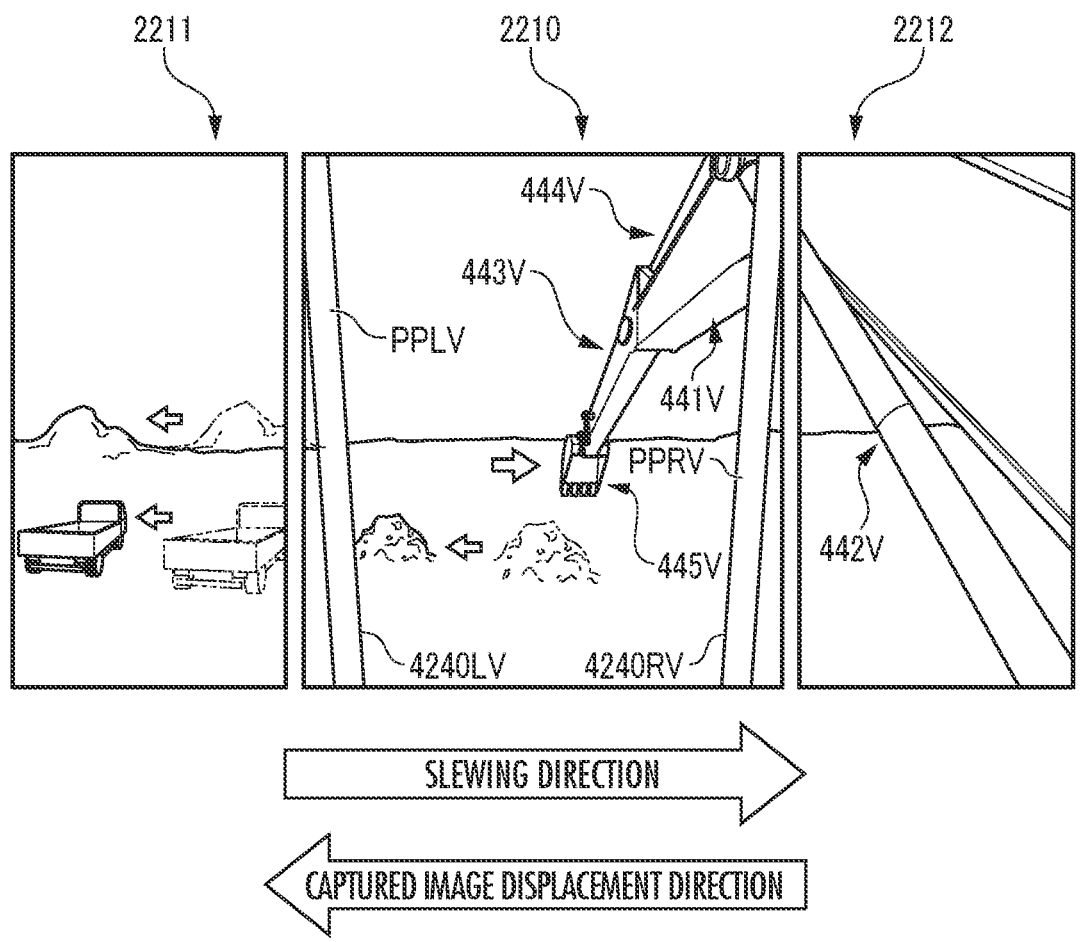
FIG. 6 is an explanatory diagram related to the display appearance of a simulated environment image as one embodiment of a remote operation assistance device configured according to the present invention.

With this arrangement, as illustrated in FIG. 6, for example, a simulated environment image as if captured by the machine imaging device 412 installed onboard the work machine 40 linked to the remote operation device 20 is outputted on the image output device 221.

The remote control device 200 determines whether an operation for stopping the output of the simulated environment image has been performed through the remote input interface 210 (FIG. 4, STEP 215). The operation for stopping the output of the simulated environment image is an operation such as a tap, push, pinch, or swipe on the remote input interface 210 that the operator performs to end the simulation of operating the work machine 40, for example. If the determination result is positive (FIG. 4, STEP 215: YES), the remote control device 200 transmits a request for stopping the output of the simulated environment image to the remote operation assistance server 10 through the remote wireless communication device 222 (FIG. 4, STEP 216).

On the other hand, if the determination result is negative (FIG. 4, STEP 215: NO), the remote control device 200 recognizes the manipulated state of the remote operation mechanism 211 (FIG. 4, STEP 218) and transmits a simulated operation command corresponding to the manipulated state to the remote operation assistance server 10 through the remote wireless communication device 222 (FIG. 4, STEP 219).

In the remote operation assistance server 10, if a simulated operation command is received (FIG. 4, C10), the first assistance processing element 101 recognizes simulated environment conditions according to the simulated operation command (FIG. 4, STEP 110). For example, if the manipulated state of the remote operation mechanism 211 is one causing the actuating mechanism 440 (boom 441, arm 443, bucket 445) of the work machine 40 to extend or retract, conditions in which the actuating mechanism 440 behaves accordingly in the simulated environment are recognized as the simulated environment conditions.

The first assistance processing element 101 transmits a simulated environment image to the remote operation device 20 based on the simulated environment conditions (FIG. 4, STEP 111). Thereafter, it is determined whether a request for stopping the output of the simulated environment image has been received (FIG. 4, STEP 112). If the determination result is positive (FIG. 4, STEP 112: YES), the simulation according to the present embodiment ends. If the determination result is negative (FIG. 4, STEP 112: NO), it is determined whether the designated time (second designated time point) which is the start time of the work that the operator intends to perform has been reached (FIG. 4, STEP 113). If the determination result is positive (FIG. 4, STEP 113: YES), the simulation according to the present embodiment ends. If the determination result is negative (FIG. 4, STEP 113: NO), the process from the reception of the simulated operation command is repeated (FIG. 4, C10→STEP 110→STEP 111→STEP 112→STEP 113).

In the remote operation device 20, if simulated environment data is received by the remote wireless communication device 222 included in the remote output interface 220 (FIG. 4, C20), a simulated environment image is outputted on the image output device 221 included in the remote output interface 220 (FIG. 4, STEP 214). With this arrangement, as illustrated in FIG. 6, for example, a virtual image 441V of the boom 441, a virtual image 443V of the arm 443, and a virtual image 445V of the bucket 445 showing extension or retraction to match the manipulated state of the remote operation mechanism 211 by the operator are outputted for display on the remote output interface 220 (image output device 221).

With this arrangement, the operator can ascertain the correlation between the feel for the controls of the actuating mechanism 440 (boom 441, arm 443, bucket 445), or in other words the manipulated state of the remote operation mechanism 211, and the behavior of the actuating mechanism 440 (boom 441, arm 443, bucket 445) of the work machine 40.

Also, as illustrated in FIG. 6, if the operator manipulates the remote operation mechanism 211 to cause the upper slewing body 460 of the work machine 40 to slew to the right with respect to the operators position, a virtual image of the background at the worksite may be displaced in the opposite direction of the slewing direction (in other words, to the left with respect to the operator's position) to match the operation and outputted to the remote output interface 220 (image output device 221).

With this arrangement, the operator can ascertain the correlation between the feel for the controls of the work machine 40 that the operator intends to remotely operate, or in other words the manipulated state of the operation mechanism, and the behavior of the actuating mechanism of the work machine. In this case, in accordance with the slewing of a virtual image 460V of the upper slewing body 460 (FIG. 7), the background of the worksite (such as an excavator which is present at the worksite and which is not being remotely operated by the operator, a demolition machine present at the worksite, a crane present at the worksite, a dump truck, a bulldozer, a wheel loader, sand piles, rocks, trees, woods, forests, buildings, and slopes) is displayed on the remote output interface 220 (image output device 221) so as to be scrolled (displaced to the right from the operator's perspective). Consequently, the operator can ascertain in particular the correlation between the feel for the controls of the actuating mechanism 440 (upper slewing body 460), or in other words the manipulated state of the remote operation mechanism 211, and the behavior of the actuating mechanism 440 (upper slewing body 460) of the work machine 40.

As illustrated in FIG. 6, the state of the worksite where the operator intends to perform work may be included as the background of the simulated environment image. The state of the worksite may be represented by a live-action image or by an image expressed by computer graphics (CG image). In the case where a background is included in the simulated environment image, the first assistance processing element 101 calls information related to the state of the worksite stored in association with the attributes of the work machine 40 in the database 110, and based on the information, executes a process for generating and displaying the background of the simulated environment image on the remote output interface 220, thereby causing a simulated environment image of the worksite where the operator intends to perform work to be outputted to the remote output interface 220.

For example, as illustrated in FIG. 6, based on a captured image taken by the machine imaging device 412 installed inside the cab 424, a simulated environment image may be displayed that includes at least a portion of virtual images 440V (441V, 443V, 445V) of the actuating mechanism 440 seen through a virtual image of a front window and a virtual image of a pair of left and right side windows partitioned by virtual images 4240V (4240RV, 4240LV) of a pair of left and right pillars 4240 ("L" and "R" being appended to the reference sign when distinguishing between left and right) at the front of the cab 424.

Figure 7:
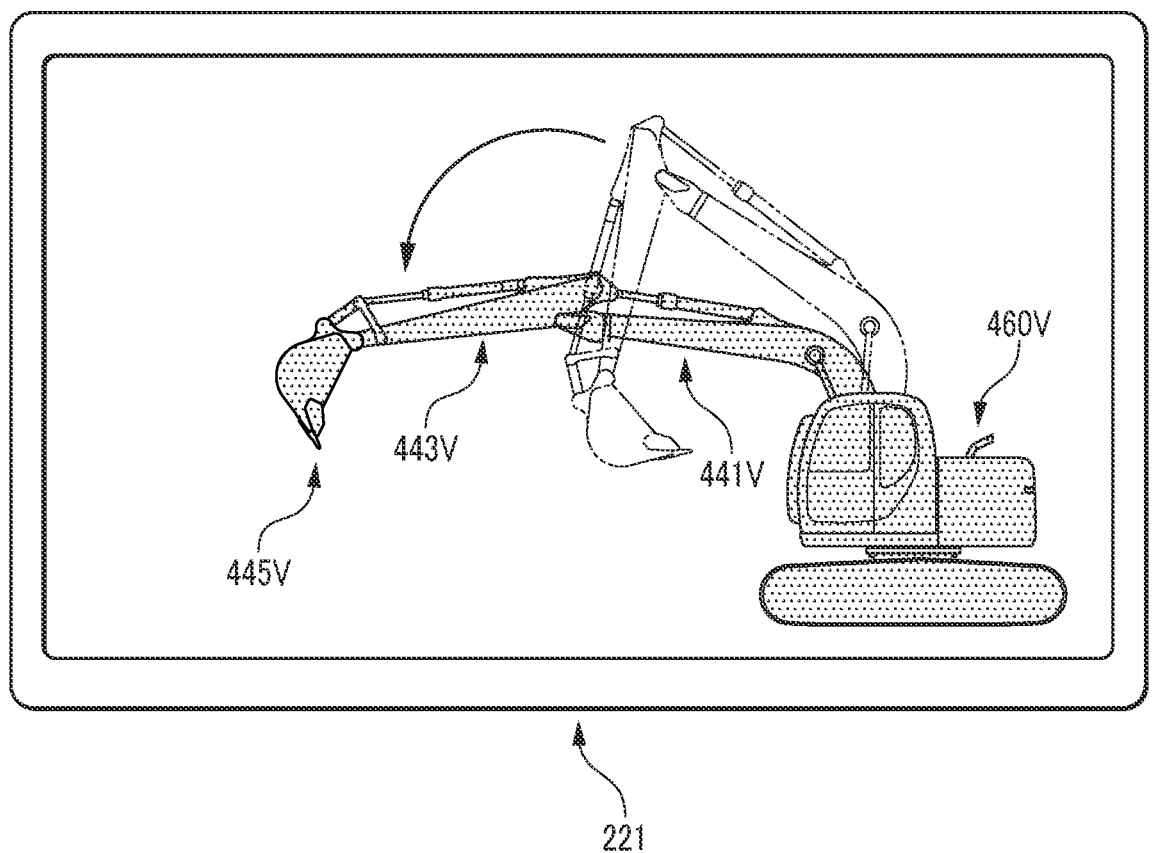
FIG. 7 is an explanatory diagram related to the display appearance of a simulated environment image related to the extension and retraction of an actuating mechanism as one embodiment of a remote operation assistance device configured according to another embodiment of the present invention.

As illustrated in FIG. 7, a simulated environment image resembling the pose of the work machine 40 as seen from the side may also be displayed. For example, when the operator manipulates the remote operation mechanism 211 to extend or retract the actuating mechanism 440 (boom 441, arm 443, bucket 445) of the work machine 40, the simulated environment image illustrated in FIG. 7 is outputted to the remote output interface 220. A simulated environment image as seen from the side as illustrated in FIG. 7 may be displayed in a corner of a simulated environment image from the interior of the cab 424 as illustrated in FIG. 6.

With this arrangement, the operator can ascertain the behavior associated with the sense of depth of the actuating mechanism 440 (boom 441, arm 443, bucket 445) of the work machine 40, which is hard to grasp from a simulated environment image from the interior of the cab 424 as illustrated in FIG. 6.

Figure 8:
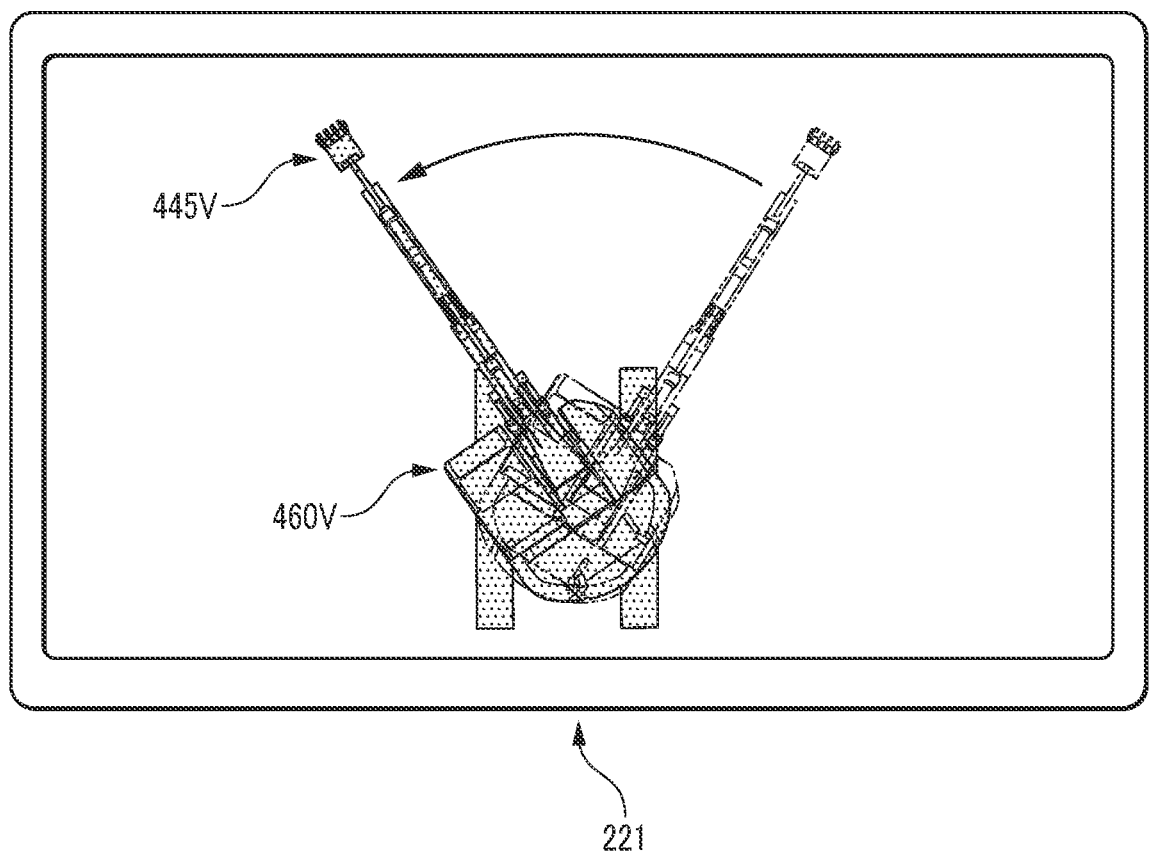
FIG. 8 is an explanatory diagram related to the display appearance of a simulated environment image related to the slewing of an upper slewing body configured according to another embodiment the present invention.

As illustrated in FIG. 8, a simulated environment image resembling the pose of the work machine 40 as seen from above may also be displayed. For example, if the operator manipulates the remote operation mechanism 211 to cause the upper slewing body 460 of the work machine 40 to slew to the left with respect to the operator's position, a virtual image 460V of the upper slewing body 460 is slewed to the left with respect to the operator's position to match the operation and displayed on the remote output interface 220 (image output device 221). A simulated environment image as seen from above as illustrated in FIG. 8 may be displayed in a corner of a simulated environment image from the interior of the cab 424 as illustrated in FIG. 6.

With this arrangement, the operator can ascertain the behavior associated with the amount of slewing (slewing angle) of the actuating mechanism 440 (upper slewing body 460) of the work machine 40, which is hard to grasp from a simulated environment image from the interior of the cab 424 as illustrated in FIG. 6.

Figure 5:
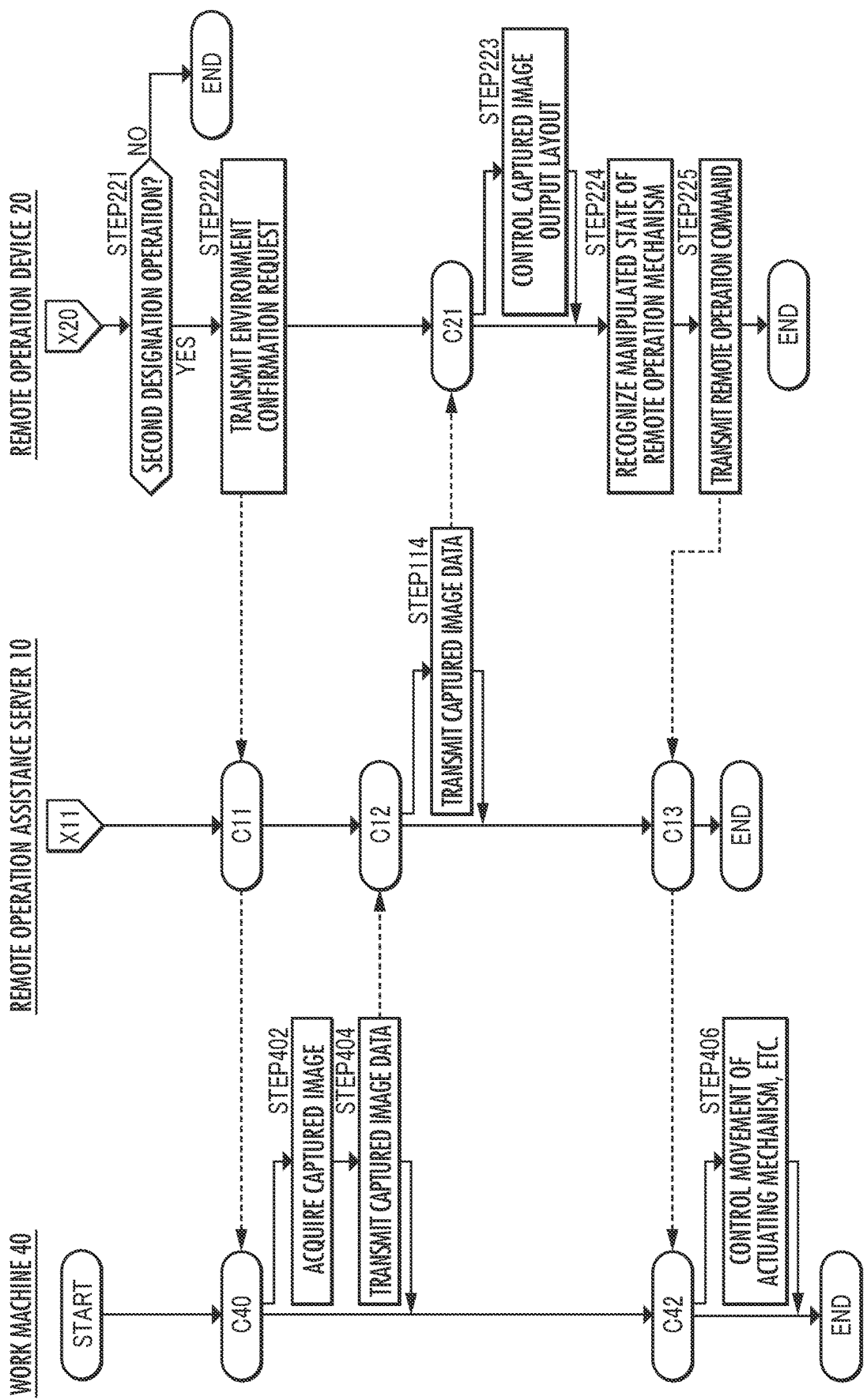
FIG. 5 is an explanatory diagram related to the functions of a second assistance processing element as one embodiment of a remote operation assistance device configured according to the present invention.

The flowchart illustrated in FIG. 5 will be used to describe a second assistance process according to the present embodiment. The second assistance process is a process for remotely operating the work machine 40 in reality.

In the remote operation device 20, the remote control device 200 determines whether a second designation operation has been performed through the remote input interface 210 (FIG. 5, STEP 221). The "second designation operation" is, for example, an operation such as a tap or push on the remote input interface 210 for designating the work machine 40 that the operator will remotely operate in reality. Another example of the "second designation operation" may include an operation such as a tap or push on the remote input interface 210 for designating the work that the operator intends to perform. The "second designation operation" is an operation for starting remote operation of the work machine 40 designated by the "first designation operation".

If the determination result is negative (FIG. 5, STEP 221: NO), the remote control device 200 repeats the process from the determination regarding the first designation operation (FIG. 4, STEP 211). On the other hand, if the determination result is positive (FIG. 5, STEP 221: YES), the remote control device 200 transmits an environment confirmation request to the remote operation assistance server 10 through the remote wireless communication device 222 (FIG. 5, STEP 222).

In the remote operation assistance server 10, if an environment confirmation request is received, the second assistance processing element 102 transmits the environment confirmation request to the relevant work machine 40 (FIG. 5, C11).

In the work machine 40, if an environment confirmation request is received through the machine wireless communication device 422 (FIG. 5, C40), the machine control device 400 acquires a captured image through the machine imaging device 412 (FIG. 5, STEP 402). Also, the machine control device 400 transmits captured image data expressing the captured image to the remote operation assistance server 10 through the machine wireless communication device 422 (FIG. 5, STEP 404).

In the remote operation assistance server 10, if captured image data is received (FIG. 5, C12), the second assistance processing element 102 transmits the captured image data to the remote operation device 20 (FIG. 5, STEP 114). Instead of the captured image data, the second assistance processing element 102 may transmit to the remote operation device 20 environment image data expressing a simulated environment image generated based on the captured image. At this time, the second assistance processing element 102 may also transmit to the remote operation device 20 a command related to a split-screen layout of the captured image according to the captured image data on the image output device 221 (central image output device 2210, left-side image output device 2211, and right-side image output device 2212).

In the remote operation device 20, if captured image data is received through the remote wireless communication device 222 (FIG. 5, C21), the remote control device 200 controls the split-screen layout of the captured image according to the captured image data on the three image output devices 221 (central image output device 2210, left-side image output device 2211, and right-side image output device 2212) (FIG. 5, STEP 223).

Also, another example of captured image output control in the remote control device 200 is an example of output control causing the captured image to be displayed only on a single image output device 221 (for example, the central image output device 2210), without displaying the captured image in a split-screen layout on the central image output device 2210, the left-side image output device 2211, and the right-side image output device 2212.

In the remote operation device 20, the remote control device 200 recognizes the manipulated state of the remote operation mechanism 211 (FIG. 5, STEP 224) and the remote control device 200 transmits a remote operation command according to the manipulated state to the remote operation assistance server 10 through the remote wireless communication device 222 (FIG. 5, STEP 225).

In the remote operation assistance server 10, if a remote operation command is received, the second assistance processing element 102 transmits the remote operation command to the work machine 40 (FIG. 5, C13).

In the work machine 40, if an operation command is received through the machine wireless communication device 422 (FIG. 5, C42), the machine control device 400 controls the movement of the actuating mechanism 440 and the like (FIG. 5, STEP 406). For example, work is executed to scoop up earth in front of the work machine 40 with the bucket 445, and after causing the upper slewing body 460 to slew, drop the earth from the bucket 445.

Effects

According to the remote operation assistance system as configured as well as the remote operation assistance server 10 and the remote operation device 20 forming the same, a simulated environment image which is for simulating remote operation of the work machine 40 and which is generated by the first assistance processing element 101 included in the remote operation assistance device 100 is outputted to and displayed by the remote output interface 220 (image output device 221). The first assistance processing element 101 generates simulated environment data based on of a work machine identifier of the work machine 40 selected by the operator, and a simulated environment image is outputted to the remote output interface 220 according to the simulated environment data. In the simulation, the manipulated state of a remote operation mechanism is recognized, a simulated operation command is generated, and a simulated environment image is outputted based on the simulated operation command.

Also, the second assistance processing element 102 executes a process for remotely operating the work machine 40. Consequently, before remotely operating the work machine 40 in reality, the operator can grasp, through the simulated environment image displayed on the remote output interface 220 (image output device 221), the correlation between the feel for the controls of the work machine 40 that the operator intends to remotely operate, or in other words the manipulated state of the remote operation mechanism 211, and the behavior of the actuating mechanism 440 in the work machine 40.

In addition, the first assistance processing element executes the first assistance process in a prescribed period in the period from a first designated time point until a second designated time point, the first designated time point being the time point at which a work target which is a target including the work machine 40 and the work to be performed using the work machine 40, or at least one thereof, is designated in STEP 211, and the second designated time point being the time point from which the work machine 40 is available for remote operation over the network by the remote operation device 20 including the remote input interface 210 (the time point from which the work machine 40 can be remotely operated in reality).

With this arrangement, the operator can use the time from the time point at which the work target is selected until the time point from which the work machine 40 is available for remote operation (the time point up to when the work machine 40 can be remotely operated) to simulate remote operation of the work machine 40. In other words, the operator can make effective use of the waiting time from the first designated time point until the second designated time point. Consequently, the work efficiency of work performed using the work machine 40 can be raised.

Additionally, in the case where information related to general operating characteristics of the work machine 40 is stored and retained in the database 110, even if information related to the specific operating characteristics of the work machine 40 is absent, the operator can simulate remote operation of the work machine 40 based on the information related to the general operating characteristics of the work machine 40. Moreover, in the case where information related to operating characteristics specific to the work machine 40 is stored and retained in the database 110, the operator can simulate remote operation of the work machine 40 based on the information related to the operating characteristics specific to the work machine 40, and thereby experience a simulation based on more specific information compared to the case of a simulation based on information related to general operating characteristics of the work machine 40.

(Other Embodiments of Remote Operation Assistance Device Configured According to Present Invention)

The above embodiment describes an example in which the first assistance process is executed by the remote operation device 20 and the remote operation assistance server 10, but is not limited to such an example. For example, the first assistance processing element 101 may also acquire communication information, that is, information related to the quality of the communication environment between the work machine 40, the remote operation assistance server 10, and the remote operation device 20 with respect to each other, and execute a process for displaying a simulated environment image on the remote output interface 220 depending on the communication information.

The "communication information" is a concept that includes information related to the strength of the radio field intensity between the work machine 40, the remote operation assistance server 10, and the remote operation device 20 with respect to each other, and is a communication speed, for example. The first assistance processing element 101 causes the work machine 40 in the simulated environment to move with a lag depending on the communication information in response to input into the remote operation mechanism 211 manipulated by the operator. For example, if the operator manipulates the remote operation mechanism 211 to extend or retract the actuating mechanism 440 (boom 441, arm 443, bucket 445) of the work machine 40, the actuating mechanism 440 moves in the simulated environment image with a delay after the manipulation.

In such a case, too, the remote operation assistance device 100 according to the remote operation assistance server 10 as configured can be applied. With this arrangement, before remotely operating the work machine 40 in reality, the operator can grasp the communication conditions through the simulated environment image outputted to the remote output interface 220 (image output device 221) in response to the manipulation of the remote operation mechanism 211.

The above embodiment describes an example in which the work machine 40 is a hydraulic excavator including the bucket 445, but is not limited to such an example. Other examples of the work machine 40 include a demolition machine fitted with a crusher apparatus instead of the bucket 445, an earthmover fitted with a grapple instead of the bucket 445, and a crane. In addition, there may be a plurality of work machines 40 that the operator intends to remotely operate. In this case, the operator can simulate the remote operation of work machines 40 with different correlations between the feel for the controls, or in other words the manipulated state of the remote operation mechanism 211, and the behavior of the actuating mechanisms 440 of the work machines 40, and get familiar with the correlations between the manipulated state of the remote operation mechanism 211 and the behavior of the actuating mechanisms 440 of the work machines 40.

For example, in the case where the operator attempts to remotely operate a mini excavator immediately after remotely operating a large-scale excavator, the correlation between the feel for the controls of the mini excavator, or in other words the manipulated state of the operation mechanism, and the behavior of the actuating mechanism of the work machine will be largely different.

However, by simulating the remote operation of the mini excavator before remotely operating the mini excavator, the operator can grasp the input magnitude of the remote input interface 210 according to the correlation between the feel for the controls of the mini excavator, or in other words the manipulated state of the operation mechanism, and the behavior of the actuating mechanism of the work machine. With this arrangement, when remotely operating the mini excavator in reality, the operator can quickly get familiar with the correlation between the feel for the controls of the mini excavator, or in other words the manipulated state of the operation mechanism, and the behavior of the actuating mechanism of the work machine.

In such a case, too, the remote operation assistance device 100 according to the remote operation assistance server 10 as configured can be applied.

The above embodiment describes an example in which the remote operation assistance device 100 is provided in the remote operation assistance server 10, but is not limited to such an example. For example, the remote control device 200 and the machine control device 400, or one thereof, may be responsible for some or all of the functions of the remote operation assistance device 100.

In such a case, too, the remote operation assistance device 100 according to the remote operation assistance server 10 as configured can be applied.

The above embodiment illustrates an example in which the boom 441, arm 443, bucket 445, and upper slewing body 460 are included in the actuating mechanism 440, but is not limited to such an example. Another example of the actuating mechanism 440 may include the lower traveling body 450. In this case, as an example of another simulation in the above embodiment, a virtual image 450V of the lower traveling body 450 is driven to cause a virtual image 40V of the work machine 40 to travel. With this arrangement, the operator can ascertain the correlation between the feel for the controls of the actuating mechanism 440 (lower traveling body 450), or in other words the manipulated state of the remote operation mechanism 211, and the behavior of the actuating mechanism 440 (lower traveling body 450) of the work machine 40.

In such a case, too, the remote operation assistance device 100 according to the remote operation assistance server 10 as configured can be applied.

The above embodiment illustrates an example in which the second assistance processing performed by the second assistance processing element 102 starts from STEP 221, but is not limited to such an example. Another example of the second assistance processing performed by the second assistance processing element 102 may be an example in which the second assistance processing element 102 determines, prior to STEP 221, whether the first assistance process has been performed in the first assistance processing element 101. If the determination is positive, the second assistance processing element 102 performs the process in STEP 221, and if the determination is negative, the second assistance processing element 102 repeats the process before the determination. With this arrangement, the operator can remotely operate the work machine 40 in reality after finishing the simulation of remote operation for the work machine 40. In other words, the operator can remotely operate the work machine 40 in reality after ascertaining the correlation between the manipulated state of the remote operation mechanism 211 and the behavior of the actuating mechanism 440 of the work machine 40. Consequently, compared to the case where actual remote operation is performed without simulation, the operator can engage in work without being excessively careful, and thereby raise the work efficiency.

In such a case, too, the remote operation assistance device 100 according to the remote operation assistance server 10 as configured can be applied.

In the above embodiment, a handheld terminal configured as a tablet PC and bidirectionally communicating with the remote operation device 20 to act as part of the remote operation device 20 may also form a part of the remote input interface 210 and the remote output interface 220. In this case, the operator can use the handheld terminal to input the first designation operation, the second designation operation, the stopping operation, and the like.

In the above embodiment, in the remote operation assistance server 10, the first assistance processing element 101 may determine whether the work machine 40 to be simulated is being remotely operated in reality or is scheduled to be used as a precondition on the first assistance process of the present embodiment. If the work machine 40 is being remotely operated in reality (not illustrated) or is going to be used, the first assistance processing element 101 ends the process before STEP 110. If the work machine 40 is not being remotely operated in reality (not illustrated) or is available for use, the first assistance processing element 101 executes the process from STEP 110 (not illustrated).

Also, preferably, the remote operation assistance device as configured
includes a second assistance processing element, and
the second assistance processing element executes a second assistance process, the second assistance process being a process for acquiring second designated operation information which is information regarding an input into the remote operation mechanism manipulated to remotely operate the work machine and enabling remote operation of the work machine based on the second designated operation information.

Effects

According to the above configuration, a remote operation assistance device according to the remote operation assistance device as configured includes a second assistance processing element. The second assistance processing element executes a second assistance process, the second assistance process being a process for acquiring second designated operation information which is information regarding an input into the remote operation mechanism manipulated to remotely operate the work machine and enabling remote operation of the work machine based on the second designated operation information. With this arrangement, the operator can remotely operate the work machine in reality.

Also, preferably, in the remote operation assistance device as configured, the first assistance processing element executes the first assistance process before the second assistance process is executed.

Effects

According to the above configuration, the first assistance processing element executes the first assistance process before the second assistance process is executed. With this arrangement, the operator can simulate the remote operation of the work machine before the work machine is remotely operated in reality. In other words, by running the simulation, the operator can grasp in advance the operating characteristics of the work machine. Consequently, the operator can grasp the operating characteristics of the work machine before remotely operating the work machine. Consequently, since the operator does not have to remotely operate the work machine while being more careful than necessary, the work efficiency of the work performed using the work machine can be raised.

Also, preferably, in the remote operation assistance device as configured, the first assistance processing element executes the first assistance process in a prescribed period in a period from a first designated time point until a second designated time point, the first designated time point being a time point at which a work target which is a target including the work machine and work to be performed using the work machine, or at least one thereof, is designated, and the second designated time point being a time point at which the work machine and a remote operation device including the remote operation mechanism are connected over a network.

Effects

According to the above configuration, the first assistance processing element executes the first assistance process in a prescribed period in a period from a first designated time point until a second designated time point, the first designated time point being a time point at which a work target which is a target including the work machine and work to be performed using the work machine, or at least one thereof, is designated, and the second designated time point being a time point at which the work machine and a remote operation device including the remote operation mechanism are connected over a network. With this arrangement, by selecting at least one of the work machine that the operator is scheduled to remotely operate or the work that the operator is scheduled to perform, the operator can simulate the remote operation of the work machine until the remote operation device and work machine are connected. In other words, since the wait time from the time point at which the operator selects the work machine until the time point at which the remote operation device and the work machine are connected can be utilized to run the simulation, the work efficiency of the work performed using the work machine can be raised.

Also, preferably, in the remote operation assistance device as configured, the first assistance processing element executes the first assistance process for acquiring characteristics information from a database storing the characteristics information, the characteristics information being information regarding operating characteristics of the work machine designated as a remote operation target, generating, based on of the characteristics information and operation information which is information regarding a manipulated state of the remote operation mechanism, the simulated environment image which is an image showing a simulated view of how the pose of the work machine changes, and outputting the simulated environment image to the remote output interface.

According to the above configuration, the first assistance processing element executes the first assistance process for acquiring characteristics information from a database storing the characteristics information, the characteristics information being information regarding operating characteristics of the work machine designated as a remote operation target, generating, based on the characteristics information and operation information which is information regarding a manipulated state of the remote operation mechanism, the simulated environment image which is an image showing a simulated view of how the pose of the work machine changes, and outputting the simulated environment image to the remote output interface. With this arrangement, a simulated environment image is displayed based on the operating characteristics of the selected work machine, and therefore the operator can grasp the behavior (operating characteristics) with consideration for differences such as size and response between work machines.

Also, preferably, in the remote operation assistance device as configured, the first assistance processing element executes the first assistance process for acquiring communication information which is information regarding the quality of the communication environment between the remote operation mechanism and the work machine, generating the simulated environment image according to the communication information, and outputting the simulated environment image to the remote output interface.

Effects

According to the above configuration, the first assistance processing element executes the first assistance process for acquiring communication information which is information regarding the quality of the communication environment between the remote operation mechanism and the work machine, generating the simulated environment image according to the communication information, and outputting the simulated environment image to the remote output interface. With this arrangement, a simulated environment image with consideration for the conditions of the communication channel is displayed on the remote output interface, and therefore the operator can grasp the operating characteristics according to the conditions of the communication channel.

Also, preferably, in the remote operation assistance device as configured, the first assistance processing element executes the first assistance process, the first assistance process being a process for acquiring operation information which is information regarding an input magnitude input into the remote operation mechanism, generating, based on operation information, the simulated environment image which is an image showing a simulated view of how the pose of an actuating mechanism included in the work machine changes, and outputting the simulated environment image to the remote output interface.

Effects

According to the above configuration, the first assistance processing element executes the first assistance process, the first assistance process being a process for acquiring operation information which is information regarding an input magnitude of the remote operation mechanism, generating, based on operation information, the simulated environment image which is an image showing a simulated view of how the pose of an actuating mechanism included in the work machine changes, and outputting the simulated environment image to the remote output interface. With this arrangement, the operator can grasp the operating characteristics related to the movement of the actuating mechanism included in the work machine.

Also, preferably, in the remote operation assistance device as configured, the first assistance processing element executes the first assistance process, the first assistance process being a process for acquiring operation information which is information regarding an input magnitude of the remote operation mechanism, generating, based on operation information, the simulated environment image which is an image showing a simulated view of how an upper slewing body included in the work machine slews, and outputting the simulated environment image to the remote output interface.

Effects

According to the above configuration, the first assistance processing element executes the first assistance process, the first assistance process being a process for acquiring operation information which is information regarding an input magnitude of the remote operation mechanism, generating, based on operation information, the simulated environment image which is an image showing a simulated view of how an upper slewing body included in the work machine slews, and outputting the simulated environment image to the remote output interface. With this arrangement, if the operator performs an operation for slewing the upper slewing body, the operator can see a simulated environment image of the case where the upper slewing body slews. Furthermore, since the simulated environment image also illustrates how the background of the worksite will change (how the background will scroll) in response to the slewing while the upper slewing body is slewing, the operator can grasp the slewing characteristics of the work machine.

REFERENCE SIGNS LIST

10 remote operation assistance server
20 remote operation device
40 work machine
100 remote operation assistance device
101 first assistance processing element
102 second assistance processing element
211 remote operation mechanism
220 remote output interface
440 actuating mechanism
460 upper slewing body

The invention claimed is:

1. A remote operation assistance system including a work machine having an actuating mechanism, a remote operation device having a function of remotely operating the work machine, a remote operation assistance server which mutually transmits data between the work machine and the remote operation device, the remote operation assistance system being configured to simulate remote operation of the work machine by the remote operation device, the work machine comprising
an actual machine imaging device which acquires a captured image by capturing an environment surrounding the work machine,
an actual machine wireless communication device which receives a remote operation command transmit from the remote operation assistance server, and transmits the captured image acquired by the actual machine imaging device to the remote operation assistance server, and
an actual machine control device which controls an operation of the work machine including a behavior of the actuating mechanism based on the remote operation command received by the actual machine wireless communication device, the remote operation device comprising
a remote output interface configured by an image output device capable of outputting an image,
a remote wireless communication device which receives simulated environment data including information for generating a simulated environment image which is a simulating image of the work machine at a virtual worksite transmitted from the remote operation assistance server and captured image data transmitted from the remote operation assistance server, a remote control device configured to execute a control to output to the remote output interface, a simulated environment image according to the simulated environment data received by the remote wireless communication device, and a control to output to the remote output interface, a captured image according to the captured image data received by the remote wireless communication device, and a remote operation mechanism composed of an operation lever which receives manipulation for manipulating the actuating mechanism provided in the work machine or the actuating mechanism provided in the work machine in the virtual worksite manipulated by an operator, the remote control device being configured to recognize a manipulated state of the remote operation mechanism manipulated by the operator, and a simulated operation command or a remote operation command according to the manipulated state of the remote operation mechanism recognized by the remote control device is transmitted to the remote operation assistance server via the remote wireless communication device, the remote operation assistance server includes a first assistance processing element comprising one or more processors for executing a first assistance process for simulating a remote operation of the work machine executed before start of the remote operation of the work machine, and a second assistance processing element comprising one or more processors for executing a second assistance process for remote operation of the work machine after the simulation, the first assistance processing element executes the first assistance process prior to the second assistance process executed by the second assistance processing element, the first assistance process executed by the first assistance processing element including a process of recognizing a simulated environment condition in which a virtual work machine as the work machine at the virtual worksite operates as a behavior mode which is a behavior manner showing how a pose of the actuating mechanism changes based on the simulated operation command transmitted from the remote wireless communication device and received by the remote operation assistance server, a process of generating the simulated environment data which includes information for generating the simulated environment image which is an image showing how the pose of the actuating mechanism of the virtual work machine changes in the virtual worksite based on the recognized behavior manner, and a process of causing the remote control device to output the simulated environment image according to the simulated environment data to the remote output interface by transmitting the generated simulated environment data to the remote operation device, the second assistance process executed by the second assistance processing element including a process for causing the actual machine control device to cause the remote output interface to output the captured image according to the captured image data by sending the captured image received by the remote operation assistance server to the remote operation device, and a process for causing the actual machine control device to control the operation of the work machine based on the remote operation command by transmitting to the work machine, the remote operation command sent from the remote wireless communication device and received by the remote operation assistance server.

2. A remote operation assistance system including a work machine having an actuating mechanism, a remote operation device having a function of remotely operating the work machine, a remote operation assistance server which mutually transmits data between the work machine and the remote operation device, the remote operation assistance system simulates remote operation of the work machine by the remote operation device, the remote operation device comprising a remote output interface configured by an image output device capable of outputting an image, a remote wireless communication device which receives simulated environment data including information for generating a simulated environment image which is a simulating image of the work machine at a virtual worksite transmitted from the remote operation assistance server, a remote control device configured to execute a control to output to the remote output interface, a simulated environment image according to the simulated environment data received by the remote wireless communication device, and a remote operation mechanism composed of an operation lever which receives manipulation for manipulating the actuating mechanism provided in the work machine or the actuating mechanism provided in the work machine in the virtual worksite manipulated by an operator, the remote control device being configured to recognize a manipulated state of the remote operation mechanism manipulated by the operator, and a simulated operation command or a remote operation command according to the manipulated state of the remote operation mechanism recognized by the remote control device is transmitted to the remote operation assistance server via the remote wireless communication device, the remote operation assistance server includes a first assistance processing element comprising one or more processors for executing a first assistance process, the first assistance process executed by the first assistance processing element including, a process for acquiring communication information which is information regarding a quality of a communication environment between the remote operation device including the remote operation mechanism and the work machine, a process for recognizing a situation where the work machine in the simulated environment operates with a delay with respect to an input of the remote operation mechanism as a behavior mode which is a behavior manner showing how a pose of the actuating mechanism changes based on the acquired communication information and the remote operation command transmit from the remote wireless communication device received by the remote operation assistance server, a process for generating the simulated environment data which includes information for generating the simulated environment image which is an image showing how a pose of the work machine changes in a virtual worksite based on the recognized behavior mode, and a process of causing the remote control device to output the simulated environment image according to the simulated environment data to the remote output interface by transmitting the generated simulated environment data to the remote operation device.

3. The remote operation assistance system according to claim 1, wherein the remote operation device includes a remote input interface which receives a designation operation by the operator for designating the work machine, the remote control device transmits first operation signal via the remote wireless communication device when the remote input interface receives the designation operation, the first assistance processing element executes the first assistance process when the remote operation assistance server receives the first operation signal, and the first assistance processing element executes the first assistance process in a prescribed period in a period from a time point at which the remote operation assistance server receives the first operation signal until a second designated time point which is a time point at which the work machine and a remote operation device including the remote operation mechanism are connected over a network.

4. The remote operation assistance system according to claim 1, wherein the remote operation assistance server includes a database which stores and holds information related to general operating characteristics information of the work machine, and the first assistance processing element executes a process for acquiring characteristics information from the database storing the characteristics information, the characteristics information being information regarding operating characteristics of the work machine designated as a remote operation target, generating, based on the characteristics information and operation information which is information regarding a manipulated state of the remote operation mechanism, the simulated environment data.

5. The remote operation assistance system according to claim 1, wherein the work machine includes an actuating mechanism capable of changing a pose, the actual machine control device controls the operation of the work machine including the actuating mechanism based on the remote operation command received by the actual machine wireless communication device, the remote operation mechanism receives a manipulation of the operator which is a manipulation for operating the work machine and includes a manipulation for operating the actuating mechanism of the work machine, the first assistance processing element executes the first assistance process, the first assistance process including a process of recognizing based on the remote operation command transmit from the remote wireless communication device and received by the remote operation assistance server, a simulated environment condition in which the work machine including the actuating mechanism operates as the behavior mode, a process of generating the simulated environment data which includes information for generating the simulated environment image which is an image showing how the pose including the actuating mechanism of the work machine changes in the virtual worksite based on the recognized behavior mode, and a process of causing the remote control device to output the simulated environment image according to the simulated environment data to the remote output interface by transmitting the generated simulated environment data to the remote operation device.

6. The remote operation assistance system according to claim 2, wherein the work machine includes an actuating mechanism capable of changing a pose, the remote operation mechanism receives a manipulation of the operator which is a manipulation for operating the work machine and includes a manipulation for operating the actuating mechanism of the work machine, the first assistance processing element executes the first assistance process, the first assistance process including a process for acquiring the communication information which is information regarding a quality of a communication environment between the remote operation device including the remote operation mechanism and the work machine, a process for recognizing a situation where the work machine including the actuating mechanism in the simulated environment operates with a delay with respect to the input of the remote operation mechanism as the behavior mode based on the acquired communication information and the remote operation command transmit from the remote wireless communication device received by the remote operation assistance server, a process for generating the simulated environment data which includes information for generating the simulated environment image which is an image showing how the pose of the work machine including the actuating mechanism changes in the virtual worksite based on the recognized behavior mode, and a process of causing the remote control device to output the simulated environment image according to the simulated environment data to the remote output interface by transmitting the generated simulated environment data to the remote operation device.

7. The remote operation assistance system according to claim 1, wherein the work machine includes an upper slewing body capable of slewing by a slewing mechanism, the actual machine control device controls the operation of the work machine including the slewing mechanism based on the remote operation command received by the actual machine wireless communication device, the remote operation mechanism receives a manipulation of the operator which is a manipulation for operating the work machine and includes a manipulation for operating the slewing mechanism of the work machine, the first assistance processing element executes the first assistance process, the first assistance process including a process of recognizing based on the remote operation command transmit from the remote wireless communication device and received by the remote operation assistance server, a simulated environment condition in which the work machine including the slewing mechanism operates as the behavior mode, a process of generating the simulated environment data which includes information for generating the simulated environment image which is an image showing how the pose including the slewing mechanism of the work machine changes in the virtual worksite based on the recognized behavior mode, and a process of causing the remote control device to output the simulated environment image according to the simulated environment data to the remote output interface by transmitting the generated simulated environment data to the remote operation device.

8. A remote operation assistance method used to simulate remote operation of a work machine having an actuating mechanism by a remote operation device, the remote operation assistance method comprising a first assistance processing step and a second assistance processing step, a first assistance processing step comprising
recognizing a simulated environment condition in which the work machine operates as a behavior mode; which is a behavior manner showing how a pose of the actuating mechanism changes,
generating a simulated environment image which is an image showing how a pose of the work machine changes in a virtual worksite based on the behavior mode;
causing an output of the simulated environment image to the remote operation device,
performing a simulated operation of the work machine based on the simulated environment image,
the second assistance process step comprising
outputting a captured image of an environment surrounding the work machine to the remote operation device; and
controlling an operation of the work machine based on the captured image of the environment surrounding the work machine,
wherein the first assistance process step is performed prior to the second assistance process step.

9. The remote operation assistance system according to claim 2, wherein the remote operation device includes a remote input interface which receives a designation operation by the operator for designating the work machine, the remote control device transmits first operation signal via the remote wireless communication device when the remote input interface receives the designation operation, the first assistance processing element executes the first assistance process when the remote operation assistance server receives the first operation signal, and the first assistance processing element executes the first assistance process in a prescribed period in a period from a time point at which the remote operation assistance server receives the first operation signal until a second designated time point which is a time point at which the work machine and a remote operation device including the remote operation mechanism are connected over a network.

10. The remote operation assistance system according to claim 2, wherein the remote operation assistance server includes a database which stores and holds information related to general operating characteristics information of the work machine, and the first assistance processing element executes a process for acquiring characteristics information from the database storing the characteristics information, the characteristics information being information regarding operating characteristics of the work machine designated as a remote operation target, generating, based on the characteristics information and operation information which is information regarding a manipulated state of the remote operation mechanism, the simulated environment data.

11. The remote operation assistance system according to claim 2, wherein the work machine includes an upper slewing body capable of slewing by a slewing mechanism, the remote operation mechanism receives a manipulation of the operator which is a manipulation for operating the work machine and includes a manipulation for operating the slewing mechanism of the work machine, the first assistance processing element executes the first assistance process, the first assistance process including
a process for acquiring the communication information which is information regarding a quality of a communication environment between the remote operation device including the remote operation mechanism and the work machine,
a process for recognizing a situation where the work machine including the slewing mechanism in the simulated environment operates with a delay with respect to the input of the remote operation mechanism as the behavior mode based on the acquired communication information and the remote operation command transmit from the remote wireless communication device received by the remote operation assistance server,
a process for generating the simulated environment data which includes information for generating the simulated environment image which is an image showing how the pose of the work machine including the slewing mechanism changes in the virtual worksite based on the recognized behavior mode, and
a process of causing the remote control device to output the simulated environment image according to the simulated environment data to the remote output interface by transmitting the generated simulated environment data to the remote operation device.

* * * * *